(12) United States Patent
Sandy et al.

(10) Patent No.: US 8,985,509 B2
(45) Date of Patent: Mar. 24, 2015

(54) ASSEMBLY FOR MOUNTING A TURBINE ENGINE TO A PYLON

(75) Inventors: David F. Sandy, Milford, CT (US); Zhijun Zheng, Avon, CT (US); Stephen P. Dailey, Ellington, CT (US); Joseph P. Foster, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 242 days.

(21) Appl. No.: 13/601,395

(22) Filed: Aug. 31, 2012

(65) Prior Publication Data

US 2014/0061375 A1    Mar. 6, 2014

(51) Int. Cl.
*B64D 27/10*     (2006.01)
*B64D 27/26*     (2006.01)
*F02C 7/20*      (2006.01)
*F02K 3/06*      (2006.01)

(52) U.S. Cl.
CPC .......... *B64D 27/26* (2013.01); *B64D 2027/268* (2013.01); *F02C 7/20* (2013.01); *F02K 3/06* (2013.01)
USPC ............... 244/54; 248/554; 248/555; 60/796; 60/797

(58) Field of Classification Search
USPC ................ 244/54; 60/796, 797; 248/554, 555
See application file for complete search history.

(56) References Cited

U.S. PATENT DOCUMENTS

| | | | |
|---|---|---|---|
| 4,428,189 A | 1/1984 | Greenberg et al. | |
| 4,687,413 A | 8/1987 | Prario | |
| 5,277,382 A | 1/1994 | Seelen et al. | |
| 5,320,307 A * | 6/1994 | Spofford et al. | 244/54 |
| 5,524,847 A | 6/1996 | Brodell et al. | |
| 5,871,177 A * | 2/1999 | Demouzon et al. | 244/54 |
| 6,173,919 B1 * | 1/2001 | Le Blaye | 244/54 |
| 6,330,995 B1 | 12/2001 | Mangeiga et al. | |
| 6,347,765 B1 * | 2/2002 | Jule et al. | 244/54 |
| 6,607,165 B1 | 8/2003 | Manteiga et al. | |
| 6,843,449 B1 | 1/2005 | Manteiga et al. | |
| 7,797,947 B2 | 9/2010 | Lafont et al. | |
| 8,074,923 B2 | 12/2011 | Foster | |
| 8,104,708 B2 | 1/2012 | Chouard et al. | |
| 8,128,021 B2 | 3/2012 | Suciu et al. | |
| 8,167,237 B2 | 5/2012 | Suciu et al. | |
| 8,215,580 B2 | 7/2012 | Balk | |
| 2008/0169378 A1 | 7/2008 | Beaufort et al. | |
| 2009/0184197 A1 | 7/2009 | Cloft | |
| 2010/0127118 A1 * | 5/2010 | Combes et al. | 244/54 |

OTHER PUBLICATIONS

International search report for PCT/US2013/057831 dated Nov. 12, 2013.

* cited by examiner

*Primary Examiner* — Philip J Bonzell
*Assistant Examiner* — Nicholas McFall
(74) *Attorney, Agent, or Firm* — O'Shea Getz P.C.

(57) ABSTRACT

An assembly for mounting a turbine engine to a pylon includes a mounting beam, a plurality of fasteners, a first mounting linkage and a second mounting linkage. The mounting beam includes a mount beam fitting that extends axially between a first mount beam end and a second mount beam end, and a mount beam flange that extends radially out from the mount beam fitting at the first mount beam end. A first fastener aperture extends radially through the mount beam fitting, and a second fastener aperture extends axially through the mount beam flange. The fasteners connect the mounting beam to the pylon. A first of the fasteners is mated with the first fastener aperture, and a second of the fasteners is mated with the second fastener aperture. The first mounting linkage connects the first mount beam end to a first engine attachment. The second mounting linkage connects the second mount beam end to second engine attachments.

21 Claims, 3 Drawing Sheets

ASSEMBLY FOR MOUNTING A TURBINE ENGINE TO A PYLON

BACKGROUND OF THE INVENTION

1. Technical Field

The present invention relates generally to a turbine engine system and, more particularly, to an assembly for mounting a turbine engine to a pylon.

2. Background Information

Various assemblies are known in the art for mounting a turbine engine to a pylon, which typically connects the engine to an aircraft wing. One such mounting assembly includes a mounting beam for mounting a forward portion of the turbine engine to a forward portion of the pylon. The mounting beam includes an axially extending surface that engages a corresponding axially extending mounting surface of the pylon. A plurality of fasteners extend radially through the mounting beam and into the pylon to connect the mounting beam to the pylon. These fasteners are subject to relatively large tension loads. Such fasteners therefore may have relatively large diameters in order to accommodate the relatively large tension loads to which they are subjected. Additionally, the flanges to which these fasteners mate may carry this same tension load out of the plane of the structure. Such large diameter fasteners and the associated structure, however, may significantly increase mounting assembly weight and cost.

SUMMARY OF THE DISCLOSURE

According to an aspect of the invention, an assembly is provided for mounting a turbine engine to a pylon. The turbine engine includes a first engine attachment arranged circumferentially between a plurality of second engine attachments. The assembly includes a mounting beam having a mount beam fitting and a mount beam flange, a plurality of fasteners, a first mounting linkage and a second mounting linkage. The mount beam fitting extends axially between a first mount beam end and a second mount beam end. The mount beam flange extends radially out from the mount beam fitting at the first mount beam end. A first fastener aperture extends radially through the mount beam fitting, and a second fastener aperture extends axially through the mount beam flange. The fasteners connect the mounting beam to the pylon. A first of the fasteners is mated with the first fastener aperture, and a second of the fasteners is mated with the second fastener aperture. The first mounting linkage connects the first mount beam end to the first engine attachment, and the second mounting linkage connects the second mount beam end to the second engine attachments.

According to another aspect of the invention, an assembly is provided for mounting a turbine engine to an airframe; e.g., an aircraft wing. The turbine engine includes a first engine attachment arranged circumferentially between a plurality of second engine attachments. The assembly includes a pylon, a mounting beam having a mount beam fitting and a mount beam flange, a plurality of fasteners, a first mounting linkage and a second mounting linkage. The pylon extends axially between a forward pylon end and an aft pylon end. The mount beam fitting extends axially between a first mount beam end and a second mount beam end. The mount beam flange extends radially out from the mount beam fitting at the first mount beam end. The fasteners connect the mounting beam to the forward pylon end. A first of the fasteners extends radially through the mount beam fitting and into the pylon, and a second of the fasteners extends axially through the mount beam flange and into the pylon. The first mounting linkage connects the first mount beam end to the first engine attachment. The second mounting linkage connects the second mount beam end to the second engine attachments.

According to still another aspect of the invention, a turbine engine assembly is provided for mounting to a pylon that extends axially between a forward pylon end and an aft pylon end. The assembly includes a turbine engine, a mounting beam having a mount beam fitting and a mount beam flange, a plurality of fasteners, a first mounting linkage and a second mounting linkage. The turbine engine includes a first engine attachment arranged circumferentially between a plurality of second engine attachments. The mount beam fitting extends axially between a first mount beam end and a second mount beam end. The mount beam flange extends radially out from the mount beam fitting at the first mount beam end. A first fastener aperture extends radially through the mount beam fitting, and a second fastener aperture extends axially through the mount beam flange. The fasteners connect the mounting beam to the forward pylon end. A first of the fasteners is mated with the first fastener aperture, and a second of the fasteners is mated with the second fastener aperture. The first mounting linkage connects the first mount beam end to the first engine attachment, and the second mounting linkage connects the second mount beam end to the second engine attachments.

The first fastener aperture extends along a first aperture centerline, and the second fastener aperture extends along a second aperture centerline that may be substantially perpendicular to the first aperture centerline.

The first of the fasteners may be subject to a radial tension load between the pylon and the mount beam fitting, and the second of the fasteners may be subject to a radial shear load between the pylon and the mount beam flange.

The second of the fasteners may be loaded substantially in shear.

The second of the fasteners may include a shear bolt and a nut. The second of the fasteners may alternatively include a shear pin as well as, in some embodiments, a shear bolt and a nut, where a shaft of the shear bolt extends axially through an inner bore of the shear pin.

A shear pin aperture may extend radially into the mount beam fitting, and be located axially between the mount beam flange and the first fastener aperture. A shear pin is mated with the shear pin aperture, and may prevent axial movement between the mount beam fitting and the pylon.

A mounting protrusion may extend axially out from the first mount beam end, and be mated with a mounting protrusion aperture that extends through the first mounting linkage. In some embodiments, the first mounting linkage may include a plurality of shackle fasteners, and a shackle that extends radially between a first shackle end and a second shackle end. A plurality of circumferentially arranged shackle fastener apertures may extend axially through the shackle proximate the first shackle end, and be respectively mated with the shackle fasteners which connect the first engine attachment to the first shackle. The mounting protrusion aperture may be located circumferentially between the shackle fastener apertures.

A mounting flange may extend axially out from the second mount beam end, and be connected to the second mounting linkage by a third fastener. In some embodiments, the second mounting linkage includes a whiffletree beam connected between a first thrust link and a second thrust link. The third fastener may connect the whiffletree beam to the mounting flange. A plurality of linkage fasteners may respectively connect the first and the second thrust links to the second engine attachments.

The foregoing features and the operation of the invention will become more apparent in light of the following description and the accompanying drawings.

DETAILED DESCRIPTION OF THE INVENTION

Figure 1:
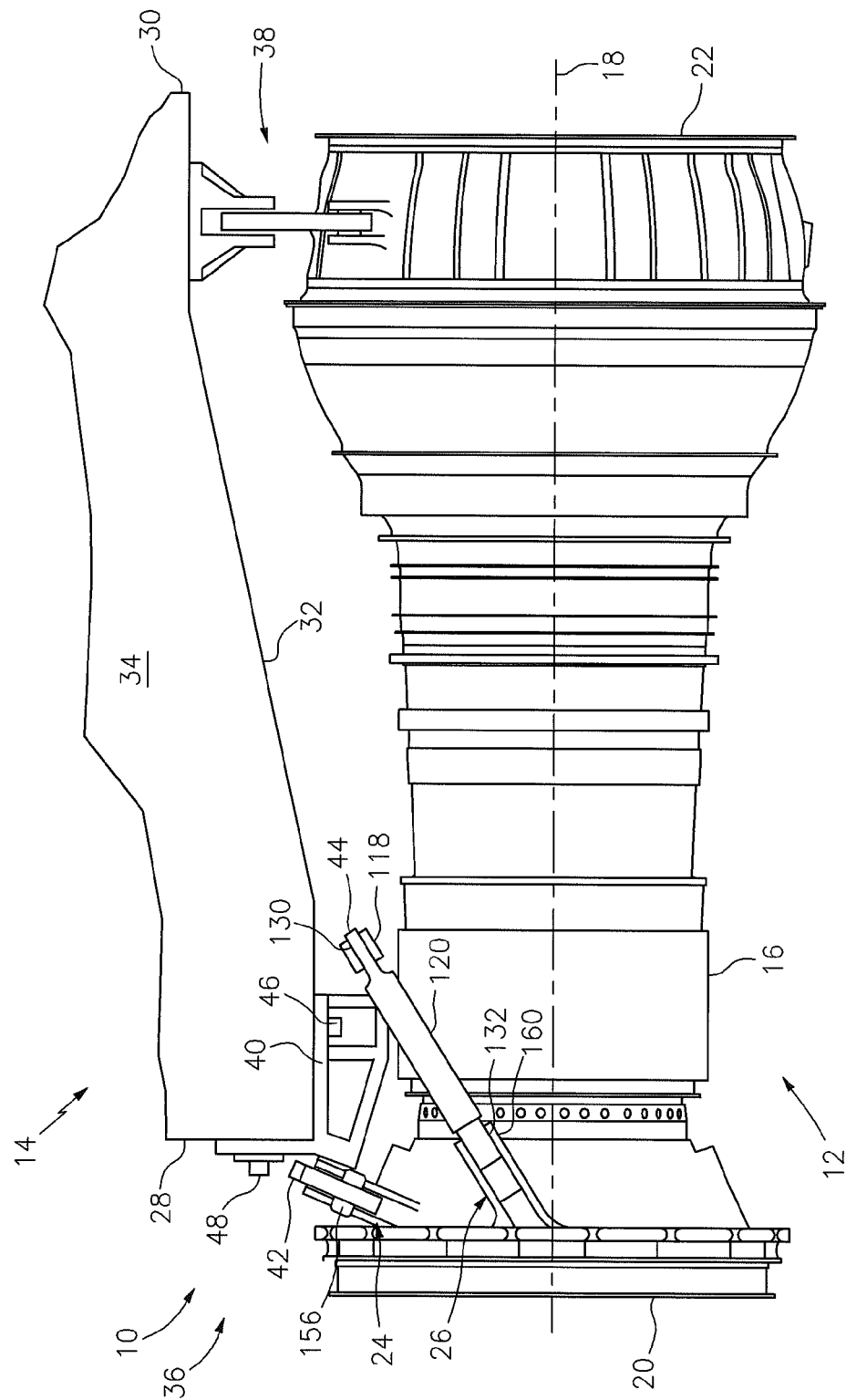
FIG. 1 is a side-view illustration an assembly for mounting a turbine engine to a pylon.

FIG. 1 illustrates a mounting assembly 10 for mounting a turbine engine 12 to a pylon 14. The turbine engine 12 includes an engine core housed within an engine case 16. The engine case 16 extends along an axial centerline 18 between a first case end 20 (e.g., forward case end at an engine core airflow inlet) and a second case end 22 (e.g., aft case end at an engine core airflow exhaust). The engine case 16 includes a first engine attachment 24 arranged circumferentially between a plurality of second engine attachments 26. The first and the second engine attachments 24 and 26 may be axially located proximate the first case end 20.

The pylon 14 extends axially between a first (e.g., forward) pylon end 28 and a second (e.g., aft) pylon end 30. The pylon 14 extends radially from a radial inner pylon end 32 to a radial outer pylon end (not shown), which may be connected to an aircraft airframe (e.g., an aircraft wing, an aircraft fuselage, etc.). The pylon 14 also extends laterally (e.g., substantially circumferentially) between opposing pylon sides 34.

The mounting assembly 10 may include one or more sub-assemblies such as, for example, a first (e.g., forward) mounting assembly 36 and a second (e.g., aft) mounting assembly 38. The first mounting assembly 36 connects the first case end 20 to the first pylon end 28, and is described below in further detail. The second mounting assembly 38 connects the second case end 22 to the second pylon end 30. Various second mounting assembly configurations are known in the art and therefore will not be described in further detail.

Figure 2:
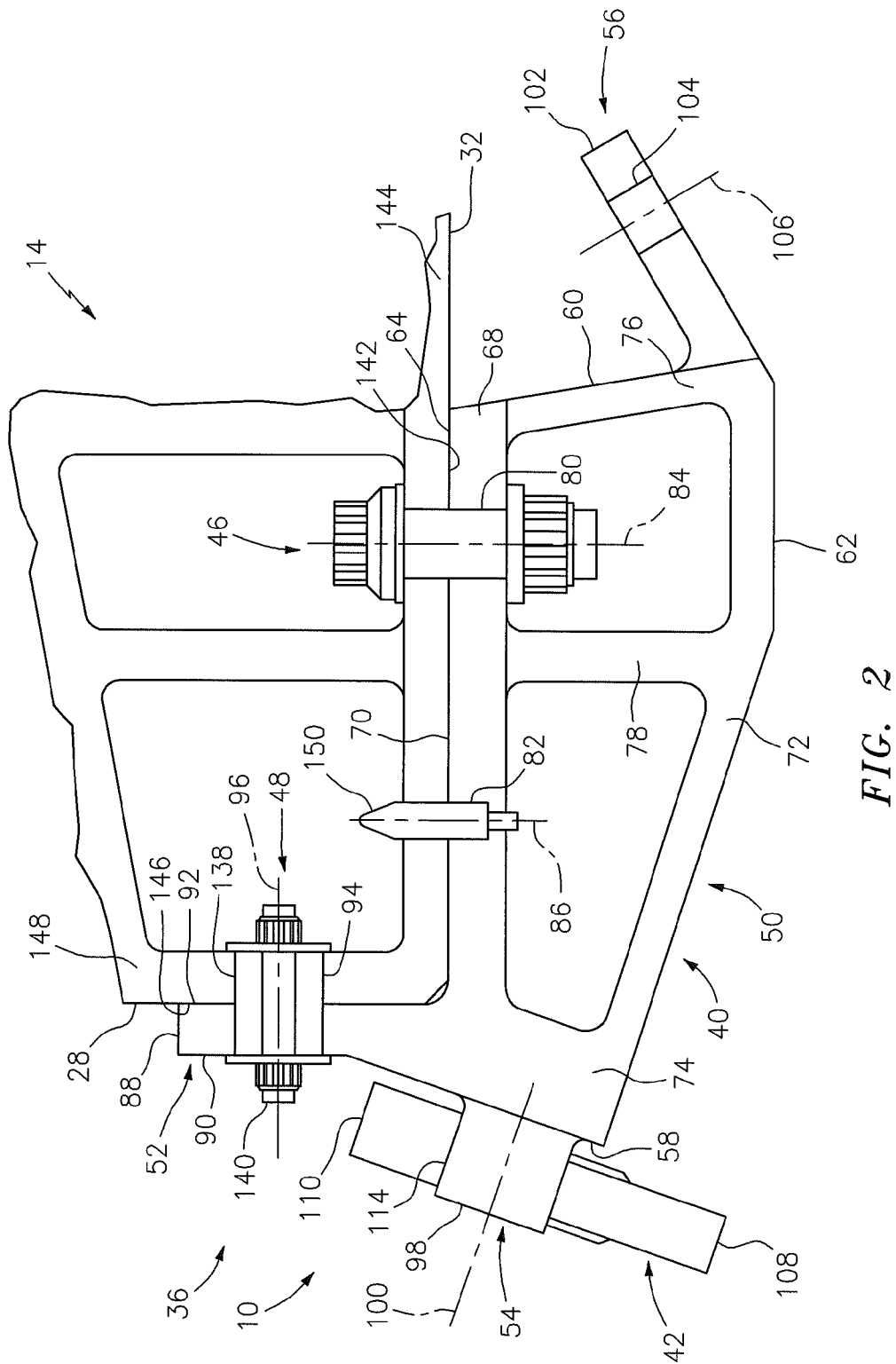
FIG. 2 is a side-sectional illustration of a forward portion of the assembly.
Figure 3:
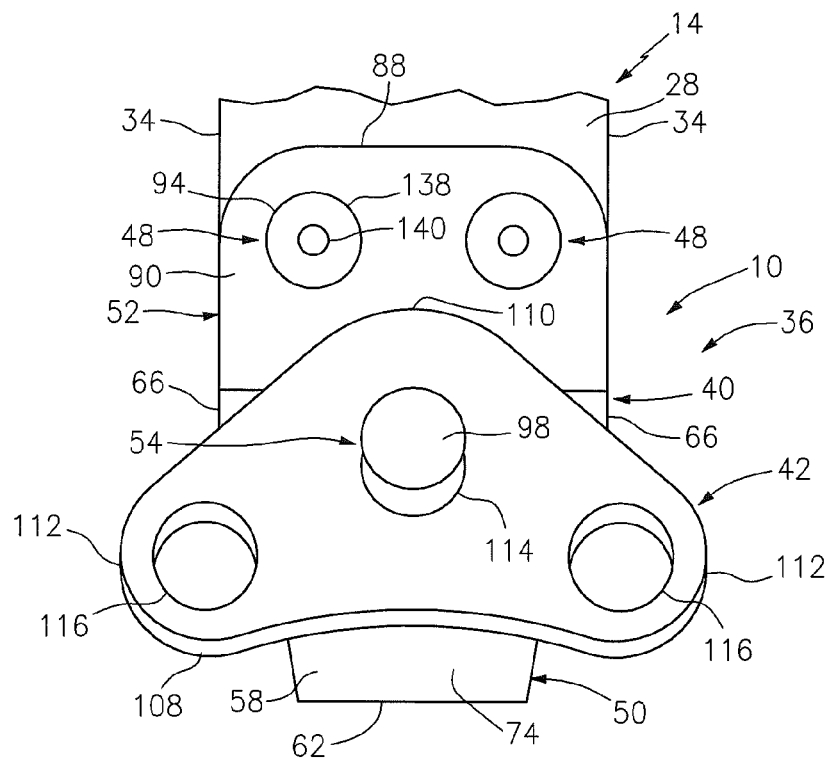
FIG. 3 is a front-view illustration of the forward portion of the assembly.
Figure 4:
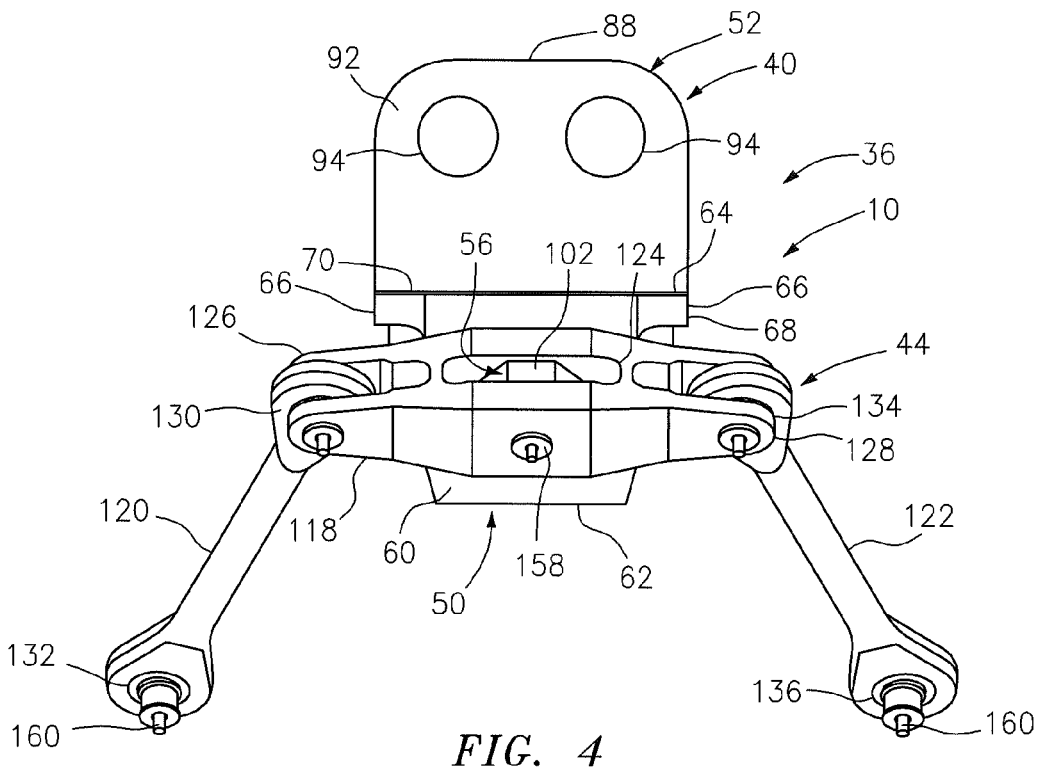
FIG. 4 is a rear-view illustration of the forward portion of the assembly.

The first mounting assembly 36 includes a mounting beam 40 (e.g., a forward mounting beam), a first mounting linkage (e.g., a shackle) 42, a second mounting linkage (e.g., a whiffletree) 44, and a plurality of fasteners 46 and 48. Referring now to FIG. 2, the mounting beam 40 includes a mount beam fitting 50, a mount beam flange 52, a first linkage (e.g., shackle) mount 54, and a second linkage (e.g., whiffletree) mount 56. The mount beam fitting 50 extends axially between a first (e.g., forward) mount beam end 58 and a second (e.g., aft) mount beam end 60. The mount beam fitting 50 extends radially between a radial inner mount beam end 62 and a radial outer mount beam end 64. Referring to FIGS. 3 and 4, the mount beam fitting 50 also extends laterally between opposing mount beam sides 66.

Referring again to FIG. 2, the mount beam fitting 50 may be configured as a webbed shear resistant beam in order to provide structural rigidity while reducing mount beam fitting 50 mass and weight. The mount beam fitting 50 illustrated in FIG. 2, for example, includes a first (e.g., radial inner) mount beam cap 68 with a first pylon contact surface 70, a second (e.g., radial outer) mount beam cap 72, a first (e.g., forward) mount beam end cap 74, and a second (e.g., aft) mount beam end cap 76. The first mount beam cap 68 is located adjacent the outer mount beam end 64, and the second mount beam cap 72 is located adjacent the inner mount beam end 62. The first mount beam cap 68 and the second mount beam cap 72 may each extend axially between and be radially separated by the first and the second mount beam end caps 74 and 76. The first mount beam end cap 74 is located adjacent the first mount beam end 58, and the second mount beam end cap 76 is located adjacent the second mount beam end 60. At least one mount beam rib 78 may also extend radially between the first mount beam cap 68 and the second mount beam cap 72 to provide additional structural rigidity. The mount beam rib 78, the second mount beam end cap 76 and the first mount beam cap 68 form a bathtub fitting to react tension loads carried by the tension fasteners 46.

The mount beam fitting 50 illustrated in FIG. 2 also includes one or more first fastener apertures 80 and one or more shear pin apertures 82. Each of the first fastener apertures 80 extends radially through the first mount beam cap 68 along a first aperture centerline 84 that is, for example, substantially perpendicular to the axial centerline 18 (see FIG. 1). The first fastener apertures 80 may be axially aligned and/or arranged between the mount beam rib 78 and the second mount beam end cap 76. Each of the shear pin apertures 82 extends radially into (e.g., through) the first mount beam cap 68 from the first pylon contact surface 70 along a shear pin aperture centerline 86 that is, for example, substantially perpendicular to the axial centerline 18 (see FIG. 1). The shear pin apertures 82 may be axially aligned and/or arranged between the first mount beam end cap 74 and the mount beam rib 78.

The mount beam flange 52 extends radially from the outer mount beam end 64 to a mount beam flange end 88, and may be axially located at (e.g., adjacent or proximate) the first mount beam end 58. The mount beam flange 52 extends axially between a first (e.g., forward) mount beam flange end 90 and a second pylon contact surface 92 at a second (e.g., aft) mount beam flange end. The second pylon contact surface 92 may be contiguous with and/or substantially perpendicular to the first pylon contact surface 70.

The mount beam flange 52 illustrated in FIG. 2 includes one or more second fastener apertures 94. Each of the second fastener apertures 94 extends axially through the mount beam flange 52 along a second aperture centerline 96 that is, for example, substantially parallel to the axial centerline 18 (see FIG. 1). The second aperture centerline 96 may also (or alternatively) be substantially perpendicular to the first aperture centerline 84. The second fastener apertures 94 may be radially aligned as illustrated in FIGS. 3 and 4.

Referring to FIGS. 2 and 3, the first linkage (e.g., shackle) mount 54 may be configured as a cylindrical mounting protrusion (hereinafter referred to as "54") that extends axially from the first mount beam end 58 to a shackle mounting protrusion end 98. The mounting protrusion 54 has a protrusion centerline 100 that may be angularly offset from the axial centerline 18 (see FIG. 1) by, for example, between about fifteen and twenty degrees (e.g., about 19°).

Referring to FIGS. 2 and 4, the second linkage (e.g., whiffletree) mount 56 may be configured as a mounting flange (hereinafter referred to as "56") that extends axially from the second mount beam end 60 to a whiffletree mounting flange end 102. The mounting flange 56 may be angularly offset from the axial centerline 18 (see FIG. 1) by, for example, about thirty degrees. At least one third fastener aperture 104 may extend radially through the mounting flange 56 along a third aperture centerline 106 that is, for example, substantially perpendicular to the mounting flange 56.

Referring to FIGS. 2 and 3, the first mounting linkage 42 may be configured as a shackle (hereinafter referred to as "42"). The shackle 42 extends radially between a first shackle end 108 and a second shackle end 110. The shackle 42 extends laterally between opposing shackle sides 112. The shackle 42 illustrated in FIGS. 2 and 3 includes a mounting protrusion aperture 114 that is arranged (e.g., centered) laterally between a plurality of shackle fastener apertures 116. The mounting protrusion aperture 114 may be centered radially between the first shackle end 108 and the second shackle end 110. The shackle fastener apertures 116 may be respectively arranged proximate the shackle sides 112 and the first shackle end 108.

Referring to FIGS. 1 and 4, the second mounting linkage may be configured as a whiffletree (hereinafter referred to as "44"). The whiffletree 44 may include a whiffletree beam 118 connected laterally between a first thrust link 120 and a second thrust link 122. The whiffletree beam 118 illustrated in FIG. 4 includes a mounting flange aperture 124 arranged laterally between a first forked end 126 and a second forked end 128. The mounting flange aperture 124 extends axially through the whiffletree beam 118. The first thrust link 120 may be configured as a strut that extends between a pair of Heim joints 130 and 132, a first 130 of which is connected to the first forked end 126 with a fastener. The second thrust link 122 may also be configured as a strut that extends between a pair of Heim joints 134 and 136, a first 134 of which is connected to the second forked end 128 with a fastener.

Referring to FIG. 2, the fasteners include one or more first (e.g., tension) fasteners 46 and one or more second (e.g., shear) fasteners 48. Each of the first fasteners 46 may include a tension bolt, a nut and/or a plurality of washers. Each of the second fasteners 48 may include a shear pin 138 (e.g., a tubular shear pin). Each of the second fasteners 48 may also or alternatively include a shear bolt 140, a nut and/or a plurality of washers, where a shaft of the shear bolt 140 extends axially through an inner bore of the shear pin 138.

Referring still to FIG. 2, the first pylon contact surface 70 engages (e.g., contacts) a first pylon surface 142 of a first pylon mounting plate 144 at the inner pylon end 32. The second pylon contact surface 92 engages a second pylon surface 146 of a second pylon mounting plate 148 at the first (e.g., forward) pylon end 28.

The first (e.g., tension) fasteners 46 are respectively mated with the first fastener apertures 80 and extend through the first pylon mounting plate 144, which connects the mount beam fitting 50 to the pylon 14. The second (e.g., shear) fasteners 48 are respectively mated with the second fastener apertures 94 and extend through the second pylon mounting plate 148, which connects the mount beam flange 52 to the pylon 14. In general, these second fasteners 48 are subject to relatively small or zero tension preloads. A plurality of shear pins 150 are also respectively mated with the shear pin apertures 82 and extend into (e.g., through) the first pylon mounting plate 144. The shear pins 150 may substantially carry the engine thrust loads.

The mounting protrusion 54 is mated with the mounting protrusion aperture 114, which connects the shackle 42 to the first mount beam end 58. Referring now to FIGS. 1 and 3, a plurality of linkage fasteners 156 extend through the first engine attachment 24 and are respectively mated with the shackle fastener apertures 116, which connects the shackle 42 to the engine case 16.

Referring to FIGS. 1, 2 and 4, the mounting flange 56 is mated with the mounting flange aperture 124. A third fastener 158 extends through the whiffletree beam 118 and mates with the third fastener aperture 104, which connects the whiffletree 44 to the second mount beam end 60. A plurality of linkage fasteners 160 respectively extend through the second engine attachments 26 and are respectively mated with the second Heim joints 132 and 136, which connects the whiffletree 44 to the engine case 16.

Referring to FIG. 1, the turbine engine 12 and the pylon 14 subject the first mounting assembly 36 to axial, radial and/or lateral loads during aircraft operation. Referring specifically to the interface between the first mounting assembly 36 and the pylon 14 illustrated in FIG. 2, the axial loads may be transferred between the mounting beam 40 and the pylon 14 through (i) the engagement between the second pylon contact surface 92 and the second pylon surface 146, and/or (ii) the shear pins 150. A relatively large portion (e.g., more than about 90 percent) of the radial loads may be transferred between the mounting beam 40 and the pylon 14 through the second (e.g., shear) fasteners 48, and the remaining relatively small portion (e.g., less than about ten percent) of the radial loads may be transferred through the first (e.g., tension) fasteners 46. The lateral loads may be transferred between the mounting beam 40 and the pylon 14 through (i) the second (e.g., shear) fasteners 48, and/or (ii) the shear pins 150. The second (e.g., shear) fasteners 48 therefore are primarily subject to shear loads, opposed to tension loads. Thus, the first mounting assembly 36 of FIG. 2 may utilize less expensive and lighter fasteners than those required by the prior art mounting assembly described above in the background section.

A person of skill in the art will recognize that the mount beam fitting, one or more of the linkage mounts, one or more of the mounting linkages, and/or one or more of the fasteners may have alternative configurations to those described above and illustrated in the drawings depending, for example, upon the loads transferred between the turbine engine and the pylon and/or other design constraints. Examples of alternative embodiment mount beam fitting, linkage mount, mounting linkage, and/or fastener configurations are disclosed in U.S. Pat. Nos. 4,428,189, 5,524,847, and 8,128,021, each of which is hereby incorporated herein by reference. The present invention therefore is not limited to any particular mount beam fitting, linkage mount, mounting linkage, and/or fastener configurations.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined within any one of the aspects and remain within the scope of the invention. Accordingly, the present invention is not to be restricted except in light of the attached claims and their equivalents.

What is claimed is:

1. An assembly for mounting a turbine engine to a pylon, the turbine engine comprising a first engine attachment arranged circumferentially between a plurality of second engine attachments, the assembly comprising:

a mounting beam comprising a mount beam fitting that extends axially between a first mount beam end and a second mount beam end, and a mount beam flange that extends radially out from the mount beam fitting at the first mount beam end, wherein a first fastener aperture extends radially through the mount beam fitting, and a second fastener aperture extends axially through the mount beam flange;

a plurality of fasteners adapted to connect the mounting beam to the pylon, wherein a first of the fasteners is mated with the first fastener aperture, and a second of the fasteners is mated with the second fastener aperture;

a first mounting linkage adapted to connect the first mount beam end to the first engine attachment; and a second mounting linkage adapted to connect the second mount beam end to the second engine attachments.

2. The assembly of claim 1, wherein the first fastener aperture extends along a first aperture centerline, and the second fastener aperture extends along a second aperture centerline that is substantially perpendicular to the first aperture centerline.

3. The assembly of claim 1, wherein the second of the fasteners is adapted to be loaded substantially in shear.

4. The assembly of claim 1, wherein the second of the fasteners comprises a shear bolt and a nut.

5. The assembly of claim 1, wherein the second of the fasteners comprises a shear pin.

6. The assembly of claim 5, wherein the second of the fasteners further comprises a shear bolt and a nut, and a shaft of the shear bolt extends axially through an inner bore of the shear pin.

7. The assembly of claim 1, wherein a shear pin aperture extends radially into the mount beam fitting, and is located axially between the mount beam flange and the first fastener aperture; and a shear pin is mated with the shear pin aperture, and is adapted to prevent axial movement between the mount beam fitting and the pylon.

8. The assembly of claim 1, wherein a mounting protrusion extends axially out from the first mount beam end, and is mated with a mounting protrusion aperture that extends through the first mounting linkage.

9. The assembly of claim 8, wherein the first mounting linkage comprises a plurality of shackle fasteners, and a shackle that extends radially between a first shackle end and a second shackle end;

a plurality of circumferentially arranged shackle fastener apertures extend axially through the shackle proximate the first shackle end, and are respectively mated with the shackle fasteners which are adapted to connect the first engine attachment to the first shackle; and the mounting protrusion aperture is located circumferentially between the shackle fastener apertures.

10. The assembly of claim 1, wherein a mounting flange extends axially out from the second mount beam end, and is connected to the second mounting linkage by a third fastener.

11. The assembly of claim 10, wherein the second mounting linkage comprises a whiffletree beam connected between a first thrust link and a second thrust link;

the third fastener connects the whiffletree beam to the mounting flange; and a plurality of linkage fasteners respectively connect the first and the second thrust links to the second engine attachments.

12. The assembly of claim 1, wherein the mount beam flange is formed integral with the mount beam fitting.

13. An assembly for mounting a turbine engine to an airframe, the turbine engine comprising a first engine attachment arranged circumferentially between a plurality of second engine attachments, the assembly comprising:

a pylon extending axially between a forward pylon end and an aft pylon end;

a mounting beam comprising a mount beam fitting that extends axially between a first mount beam end and a second mount beam end, and a mount beam flange that extends radially out from the mount beam fitting at the first mount beam end;

a plurality of fasteners that connect the mounting beam to the forward pylon end, wherein a first of the fasteners extends radially through the mount beam fitting and into the pylon, and a second of the fasteners extends axially through the mount beam flange and into the pylon;

a first mounting linkage adapted to connect the first mount beam end to the first engine attachment; and a second mounting linkage adapted to connect the second mount beam end to the second engine attachments.

14. The assembly of claim 13, wherein the first of the fasteners is subject to a radial tension load between the pylon and the mount beam fitting, and the second of the fasteners is subject to a radial shear load between the pylon and the mount beam flange.

15. The assembly of claim 13, wherein the second of the fasteners comprises a shear bolt and a nut.

16. The assembly of claim 13, wherein the second of the fasteners comprises a shear pin.

17. The assembly of claim 16, wherein the second of the fasteners further comprises a shear bolt and a nut, and a shaft of the shear bolt extends axially through an inner bore of the shear pin.

18. A turbine engine assembly for mounting to a pylon that extends axially between a forward pylon end and an aft pylon end, comprising:

a turbine engine comprising a first engine attachment arranged circumferentially between a plurality of second engine attachments;

a mounting beam comprising a mount beam fitting that extends axially between a first mount beam end and a second mount beam end, and a mount beam flange that extends radially out from the mount beam fitting at the first mount beam end, wherein a first fastener aperture extends radially through the mount beam fitting, and a second fastener aperture extends axially through the mount beam flange;

a plurality of fasteners adapted to connect the mounting beam to the forward pylon end, wherein a first of the fasteners is mated with the first fastener aperture, and a second of the fasteners is mated with the second fastener aperture;

a first mounting linkage that connects the first mount beam end to the first engine attachment; and a second mounting linkage that connects the second mount beam end to the second engine attachments.

19. The assembly of claim 18, wherein the second of the fasteners is adapted to be loaded substantially in shear.

20. The assembly of claim 18, wherein the second of the fasteners comprises a shear bolt and a nut.

21. The assembly of claim 18, wherein the second of the fasteners comprises a shear pin.

\* \* \* \* \*